(12) United States Patent
Cohen et al.

(10) Patent No.: US 7,173,814 B2
(45) Date of Patent: Feb. 6, 2007

(54) NOTEBOOK COMPUTER KEYBOARD SYSTEM

(76) Inventors: Morris S. Cohen, 1261 Ocean Parkway, Brooklyn, NY (US) 11223; Emanuel Klein, 22 Stafford La., Basking Ridge, NJ (US) 07920; Marc Shamula, 175 King St., Brewster, NY (US) 10504

( * ) Notice: Subject to any disclaimer, the term of this patent is extended or adjusted under 35 U.S.C. 154(b) by 66 days.

(21) Appl. No.: 10/325,174

(22) Filed: Dec. 20, 2002

(65) Prior Publication Data

US 2004/0243314 A1 Dec. 2, 2004
US 2005/0182567 A9 Aug. 18, 2005

Related U.S. Application Data

(63) Continuation of application No. PCT/US01/20336, filed on Jun. 19, 2001, now abandoned.

(60) Provisional application No. 60/268,037, filed on Feb. 12, 2001, provisional application No. 60/212,855, filed on Jun. 20, 2000.

(51) Int. Cl.
*G06F 1/16* (2006.01)
*B41J 5/08* (2006.01)
*G06F 3/00* (2006.01)
*H05K 5/00* (2006.01)
*H03M 11/00* (2006.01)
*G09G 5/00* (2006.01)

(52) U.S. Cl. .............. 361/680; 361/731; 400/472; 400/486; 400/489; 708/140; 341/22; 345/168; 345/170

(58) Field of Classification Search ........... 400/472, 400/473, 486, 489; 361/680, 683; 708/140
See application file for complete search history.

(56) References Cited

U.S. PATENT DOCUMENTS

| | | | | |
|---|---|---|---|---|
| 5,144,302 A | * | 9/1992 | Carter et al. | 341/20 |
| 5,237,327 A | | 8/1993 | Saitoh et al. | |
| 5,426,564 A | * | 6/1995 | Hsu | 361/707 |
| 5,539,616 A | * | 7/1996 | Kikinis | 361/686 |
| 5,644,338 A | | 7/1997 | Bowen | |
| 5,646,817 A | | 7/1997 | Manser | |
| 5,699,059 A | | 12/1997 | Hiller | |
| 5,726,684 A | * | 3/1998 | Blankenship et al. | 345/167 |
| 5,825,614 A | | 10/1998 | Kim | |
| 5,865,546 A | * | 2/1999 | Ganthier et al. | 400/489 |
| 6,104,604 A | * | 8/2000 | Anderson et al. | 361/680 |
| 6,243,035 B1 | * | 6/2001 | Walter et al. | 341/176 |
| 6,356,793 B1 | * | 3/2002 | Martin | 700/19 |
| 6,545,668 B1 | * | 4/2003 | Hayama | 345/172 |
| 6,798,359 B1 | * | 9/2004 | Ivancic | 341/23 |

* cited by examiner

*Primary Examiner*—Lisa Lea-Edmonds
*Assistant Examiner*—Zachary Pape

(57) ABSTRACT

A modular laptop computer for accommodating selective placement and customization of user interface components. The computer includes a cavity having a connection or interface or coupling region, such as a universal serial bus jack for connecting to or mating with a corresponding interface on each component. The interface connections in the cavity are connected to one or more buses for providing an interface between the attached components and a computer processor. In this manner, the components such as keyboards, trackballs, drives, music players and so forth, can all be rearranged within the cavity in the positions of the user's preference.

27 Claims, 10 Drawing Sheets

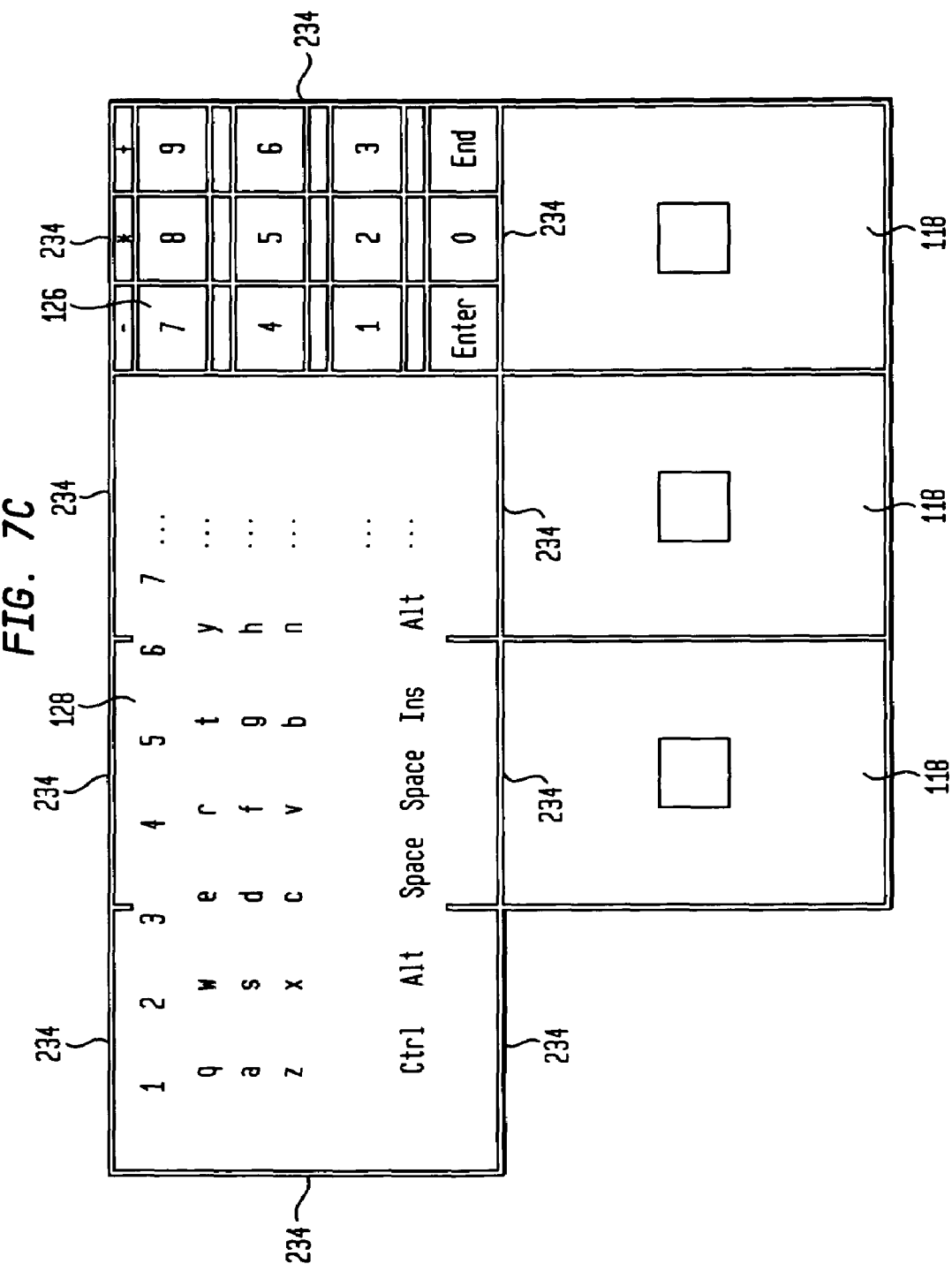

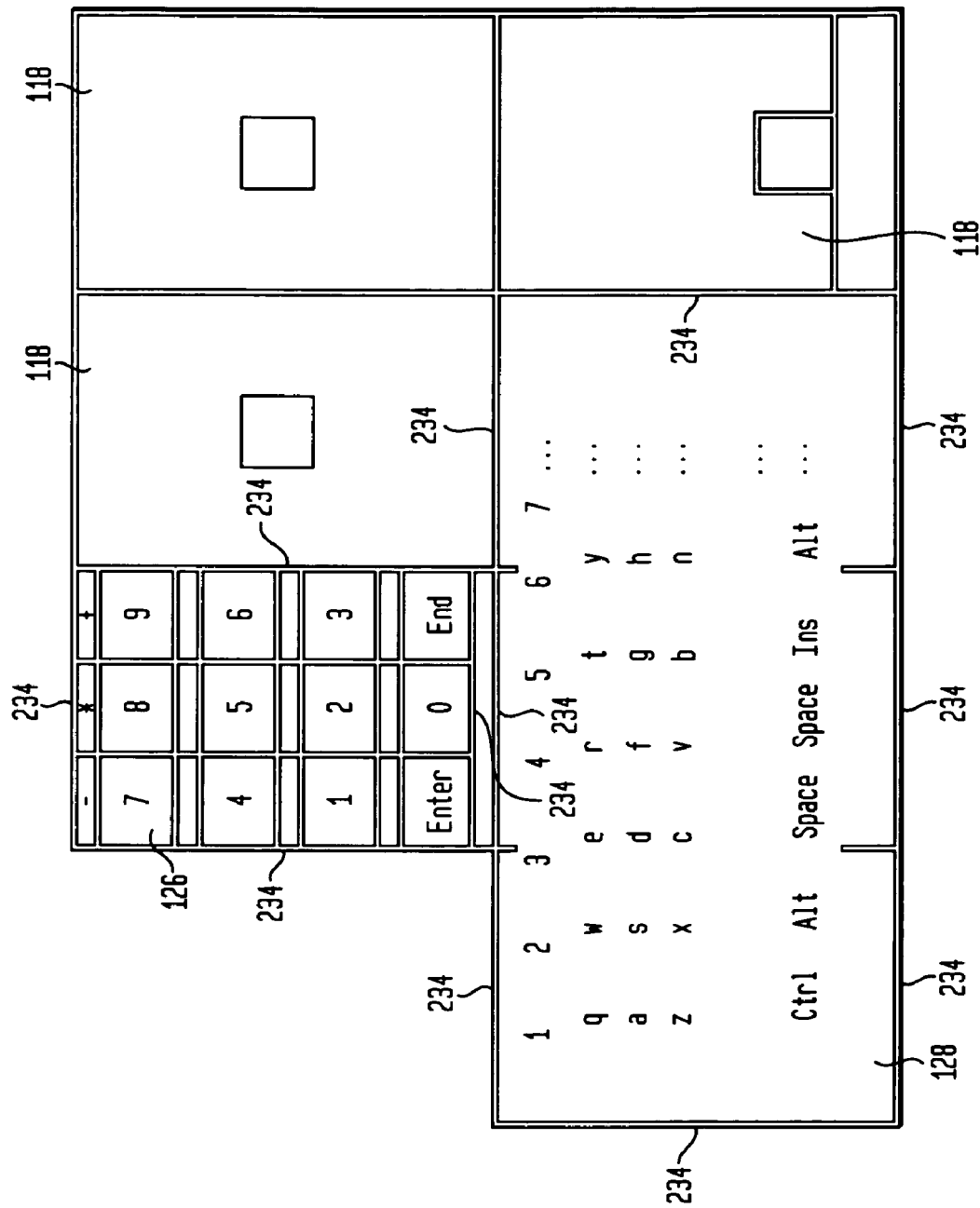

NOTEBOOK COMPUTER KEYBOARD SYSTEM

RELATED APPLICATIONS

The present application is a continuation of PCT application Ser. No. PCT/US01/20336 filed 19 Jun. 2001 (now abandoned), which claims the priority of U.S. Provisional Application Ser. No. 60/212,855 filed Jun. 20, 2000 and U.S. Provisional Application Serial No. 60/268,037 filed Feb. 12, 2001, all of which are fully incorporated herein by reference.

FIELD OF THE INVENTION

The present invention relates to computers and, more particularly, to an interface scheme for connecting and accommodating modular accessories to a computer.

BACKGROUND OF THE INVENTION

Standard desk top computer keyboards have evolved into a device having a plurality of alphanumeric and function keys that also includes an integrally formed numeric keypad, traditionally located on the right-side of the desktop computer keyboard. The inclusion of the numerous keys requires standard desktop keyboards to be relatively large and of a substantial weight. As the desktop environment typically has less demanding size and weight restrictions as compared to a portable or laptop computer, these restrictions do not present a significant drawback in standard desktop computer design. In other words, the benefit of including numerous function keys, alphanumeric keys and a numeric keypad in desktop computer keyboards far outweighs the necessary increase in size and weight of such keyboards.

In contrast to desktop computers, laptop computers are designed, by definition, to be portable. Thus, laptop computer design is constrained by device size and weight. These constraints dictate a compact size keyboard which incorporates function keys performing more than one function, and which does not include a numeric keypad, thus making entry of numeric data more difficult than on a desktop keyboard. Moreover, the layout or placement of the components of a laptop computer about the computer keyboard, such as the location of a touch pad or mouse and the connection of various other accessory devices, are often fixed in a less than desirable position. For example, a touch pad or mouse is typically located on the bottom-center region of the keyboard, and speakers may be located in a position that is obstructed by a user's wrists when the keyboard is in use, thereby obstructing sound produced by the speakers. Also, the touch pad is located on the bottom center portion of the keyboard, with the surface portions on either side of the touch pad remaining unoccupied. It is desirable that these unoccupied regions be utilized.

If a numeric keypad was included in the keyboard design, it would pose the following problems: the position of the keypad may not be properly aligned for all users (e.g. left handed and right handed users), and a numeric keypad with raised keys would not be practical because raised keys have a tendency to be depressed either accidentally or inadvertently while the computer is in use.

Accordingly, a laptop computer design is needed for allowing a user to customize the layout or placement of various data input and output devices (e.g. keyboard, speakers, mouse, etc.) to accommodate a user's preference.

SUMMARY OF THE INVENTION

A modular laptop computer is provided for accommodating selective placement and customization of user interface components. In a preferred embodiment, the computer housing is constructed to form a cavity through an upper surface in which components such as a keyboard, mouse, touch pad, speakers, storage devices, music players, Personal Digital Assistant (PDA), etc., can be contained. A surface of a cavity supports a connection or interface or coupling region, such as a universal serial bus (USB) jack for connecting to or mating with a corresponding interface on each component. The interface connections in the cavity are connected to one or more buses for providing an interface between the attached components and a computer processor. In this manner, the components can be placed and arranged within the cavity according to a user's preference.

In another embodiment, the interface region is contained along a periphery of the computer housing to accommodate connection of components along the periphery. The components may, optionally, contain a pass-through connection or interface to allow multiple components to be connected to each other while communicating with the computer processor, such as through a USB connector.

Other objects and features of the present invention will become apparent from the following detailed description considered in conjunction with the accompanying drawings. It is to be understood, however, that the drawings are designed solely for purposes of illustration and not as a definition of the limits of the invention.

BRIEF DESCRIPTION OF THE DRAWINGS

In the drawings, wherein like reference characters denote similar elements throughout the several views:

FIGS. 7A–7E depict alternative module placement configurations in accordance with the present invention.

DETAILED DESCRIPTION OF INVENTION AND THE PREFERRED EMBODIMENTS

Figure 1:
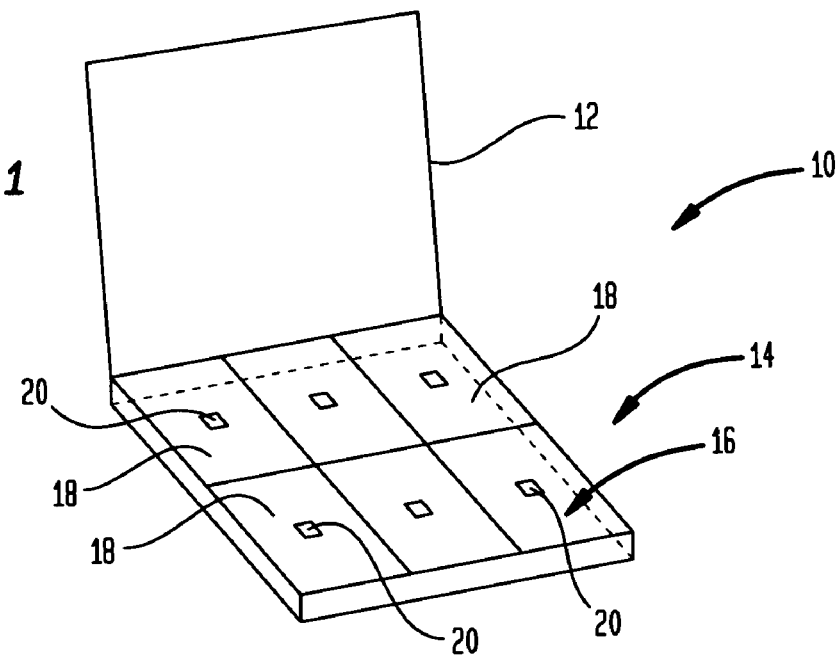
FIG. 1 is a perspective view of a computer in accordance with the present invention.

A computer 10 in accordance with a presently preferred embodiment of the invention is depicted in FIG. 1. Preferably the computer is a notebook (i.e. portable) computer. Alternately, the computer is any type of computer currently known or provided in the future in the art.

In the preferred embodiment, the computer contains two primary sections, namely a monitor 12 and a housing section 14 for containing and providing connection for various components, in a manner more fully described below. Computer 10 includes similar components to a standard laptop computer, as is known in the art, such as a disk drive, and various I/O ports for connecting to peripheral devices such as a printer, external disc drive, etc., and may receive operating power from a battery or AC power source.

Monitor 12 can be a standard laptop or notebook computer monitor as is known in the art. Such monitors move back and forth, to flip up into an open position or fold down into a closed position, similar to the opening and closing of a book. In an alternate embodiment, monitor 12 comprises a gyroscopic connection to the computer, i.e. a connection which provides rotation or tilting of said monitor along at least two different axes, as opposed to current laptop and notebook monitors which rotate along one axis only. In this alternate embodiment, the monitor 12 connects to the system unit using a gyroscopic ball or hinge, allowing it to rotate left and right in addition to opening up and folding down, such as that used, for example, on the "Tablet PC". Thus, a user can adjust the right to left angle of the monitor to show the screen to someone sitting on the left or right sides, to avoid lighting problems such as glare or reflections on the screen (e.g. from a window in an airplane), to move the screen away from view by someone nearby, or so forth.

Figure 3:
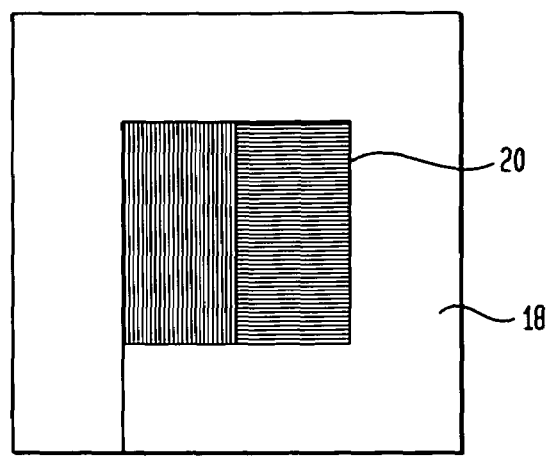
FIG. 3 is a plan view of a module interface connector.

With continued reference to FIG. 1, the computer housing section or notebook body 14 defines a mounting region (16) which is preferably segregated or divided into multiple sections 18 for accommodating various modules such as a touch pad, mouse, numeric keypad, storage device, optical device (e.g., CD, DVD, etc.), and so forth. Each section 18 contains a connector interface such as a multi-pin jack, universal serial bus connector (USB or USB 2) as shown in FIG. 3. Alternatively, any other information transfer interface for interfacing with a like connector contained on the modules, or any other system for interfacing between the modules and the computer can be used, including a wireless transmitter system such as infrared or "Bluetooth".

Figure 2:
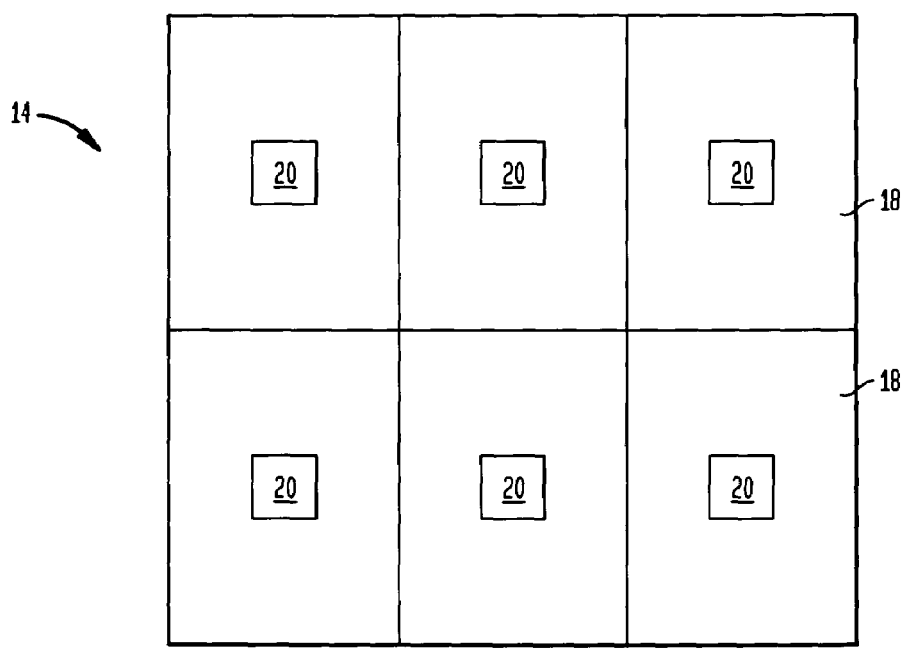
FIG. 2 is a top plan view of a module interface section of the computer of FIG. 1.
Figure 4:
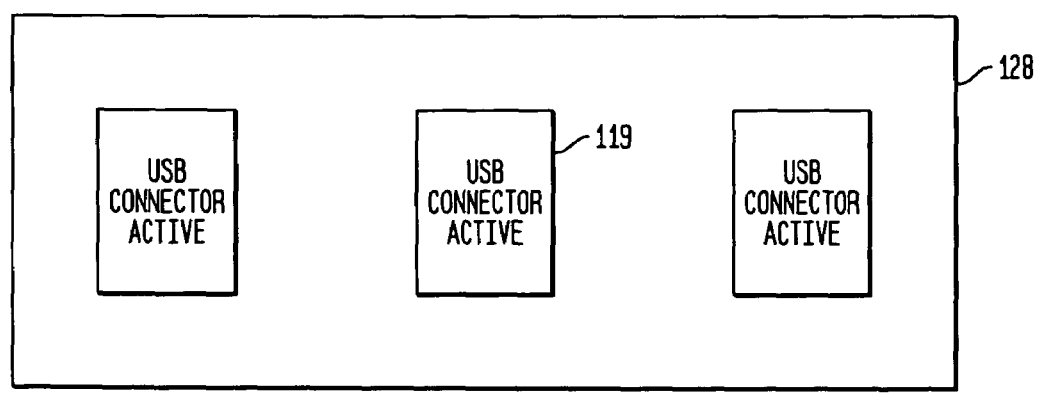
FIG. 4 is a plan view of a reverse side of a multi-position keyboard module.
Figure 5:
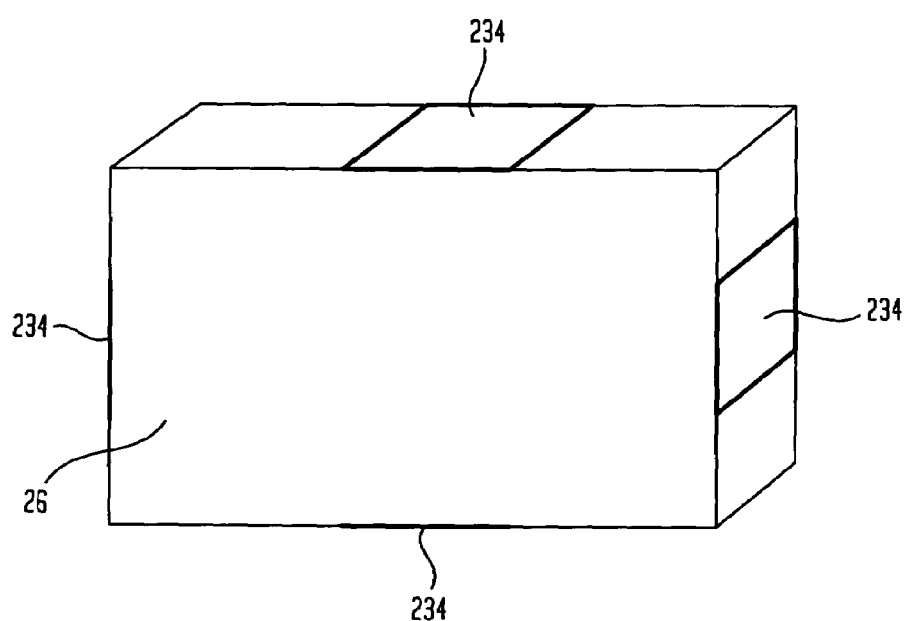
FIG. 5 is a depiction of a module for use in accordance with the present invention.
Figure 7A:
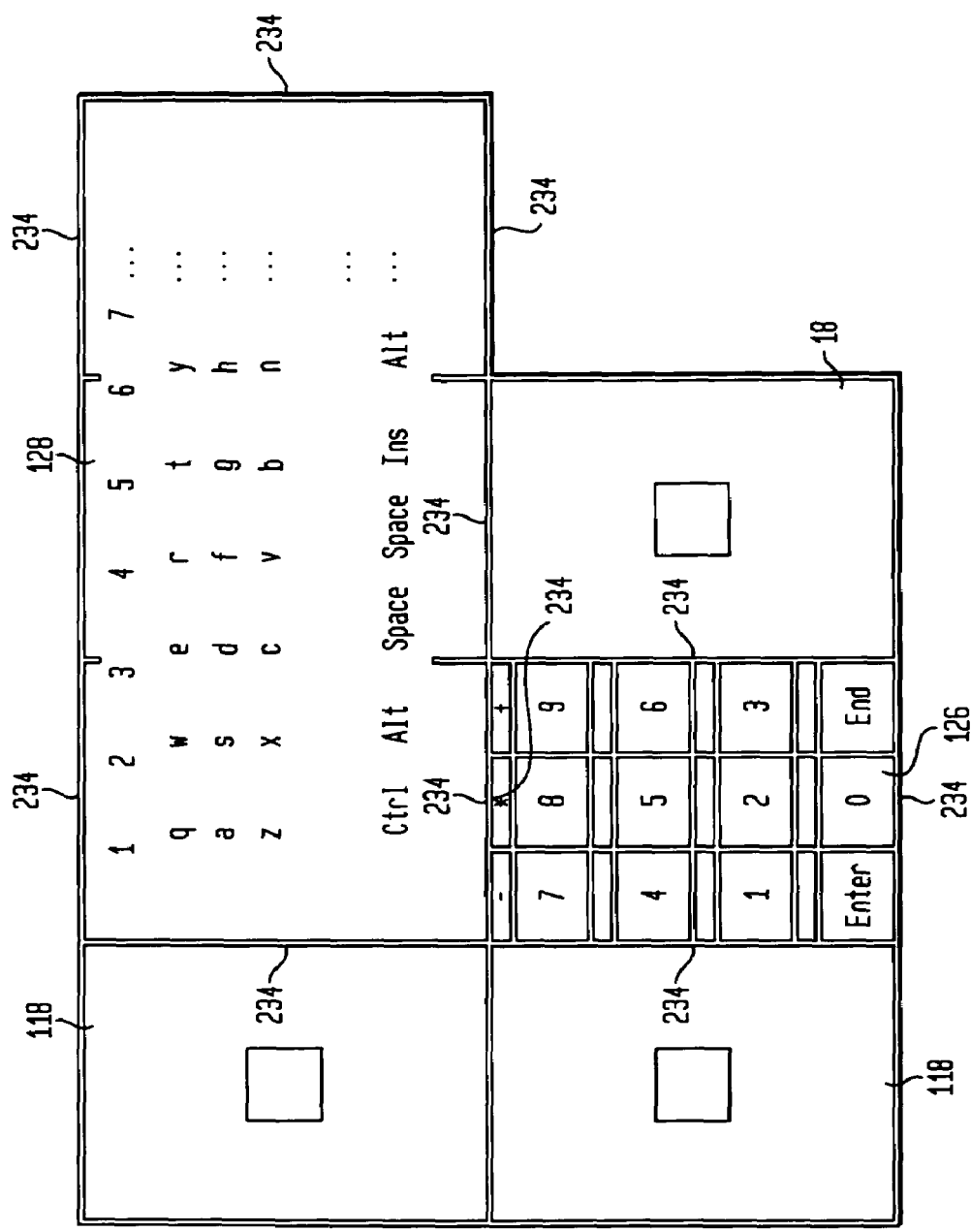

As shown in FIGS. 1 and 2, each section 18 contains an interface connector 20 for connecting to a like connector on a designated module 26, such as a keyboard 128 shown in FIG. 4 or a numeric keypad module 126 as shown in FIG. 7a. The connectors 20 provide individual interaction and communication between a specific module and another module and/or a processor of the computer for performing various computer functions. Thus, the individual connectors interface corresponding modules with an interface bus or other connection scheme which, in turn, is connected to a computer processor or other computer component.

The use of USB connectors provides the significant advantage that existing devices and protocols can be used with the invention, without the need to make any significant changes to existing devices and protocols. Numerous existing devices, in fact, can be plugged into any of the modules (e.g. via a cable) without any modification of those existing devices. Furthermore, any one of the interface connectors provided on the present invention is capable of accepting anyone of the variety of modular devices provided for use with the invention, providing complete flexibility of rearrangement. Similarly, wireless systems likewise also provide flexibility to the user.

In a preferred embodiment, the connectors 20 are interfaced with a multi-channel bus such that multiple components can be used at a given time without interfering with the operation of each other. Alternatively, and is known in the art, a multiplexing scheme of a universal connector can be employed wherein a single channel bus is used to communicate data between the computer processor and the multiple modules.

As shown in FIG. 2, and as explained above, the cavity 16 is preferably segregated into six separate sections 18, with each section having a corresponding connector 20 for mating with a like connector on a desired module. It is noted that this scheme is strictly a design choice and other section schemes can be employed so that there are greater or fewer sections than the six sections depicted in FIG. 2, and that multiple adjacent sections may share a common connector.

Figure 6:
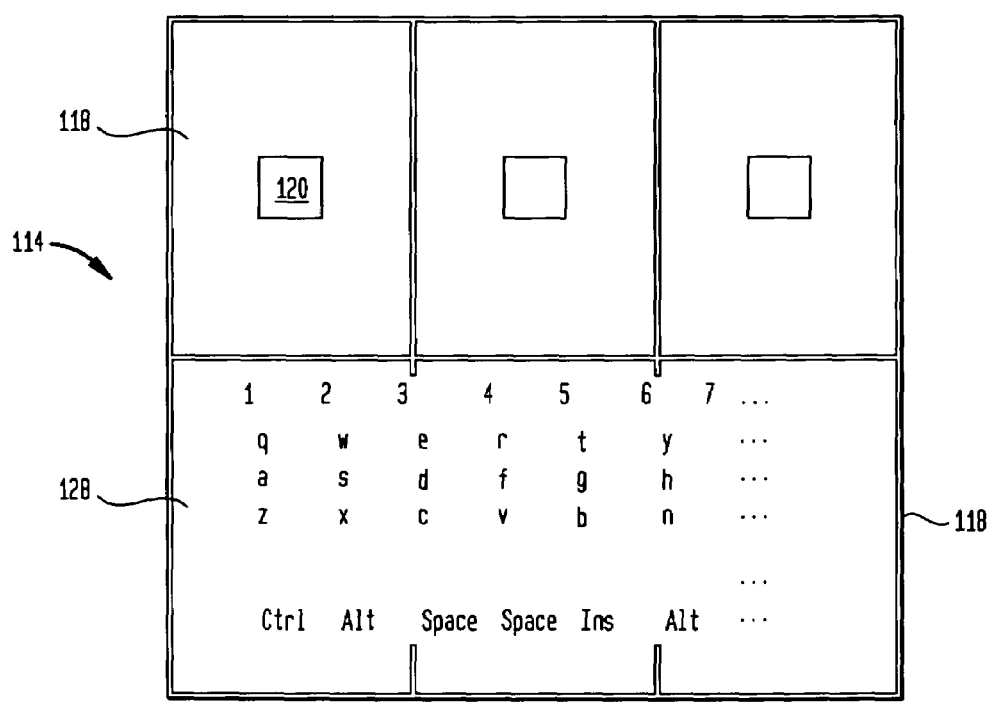
FIG. 6 is a top plan view of a module interface section containing a keyboard module.

In addition, modules may be designed which occupy more than a single module section 18. For example, and as shown in FIGS. 1 and 6, the keyboard module 128 is designed to occupy three adjacent module sections. The underside or interface area of the keyboard as shown in FIG. 4 contains multiple module interface connectors 119. One of the connectors will be active while the remaining connectors can be rendered inactive by utilizing insulator caps or plugs (not shown) which can be readily positioned on and removed from the connector locations so that only a single connector 119 will be interfaced with a like connector 120 at any given time. Thus, when the keyboard 128 is attached or "plugged-in" to the adjacent module sections 118, the active connector 119 will mate with a connector 120 in a corresponding module section 118 for providing an interface between the keyboard and the computer processor. Alternatively, a software application could be employed, as is known by those having ordinary skill in the art, to allow communication of a module having multiple connectors with only a single select connector such that, when more than one module connector is connected to the mounting region 16, only a single connector will be used for communication.

Figure 7B:
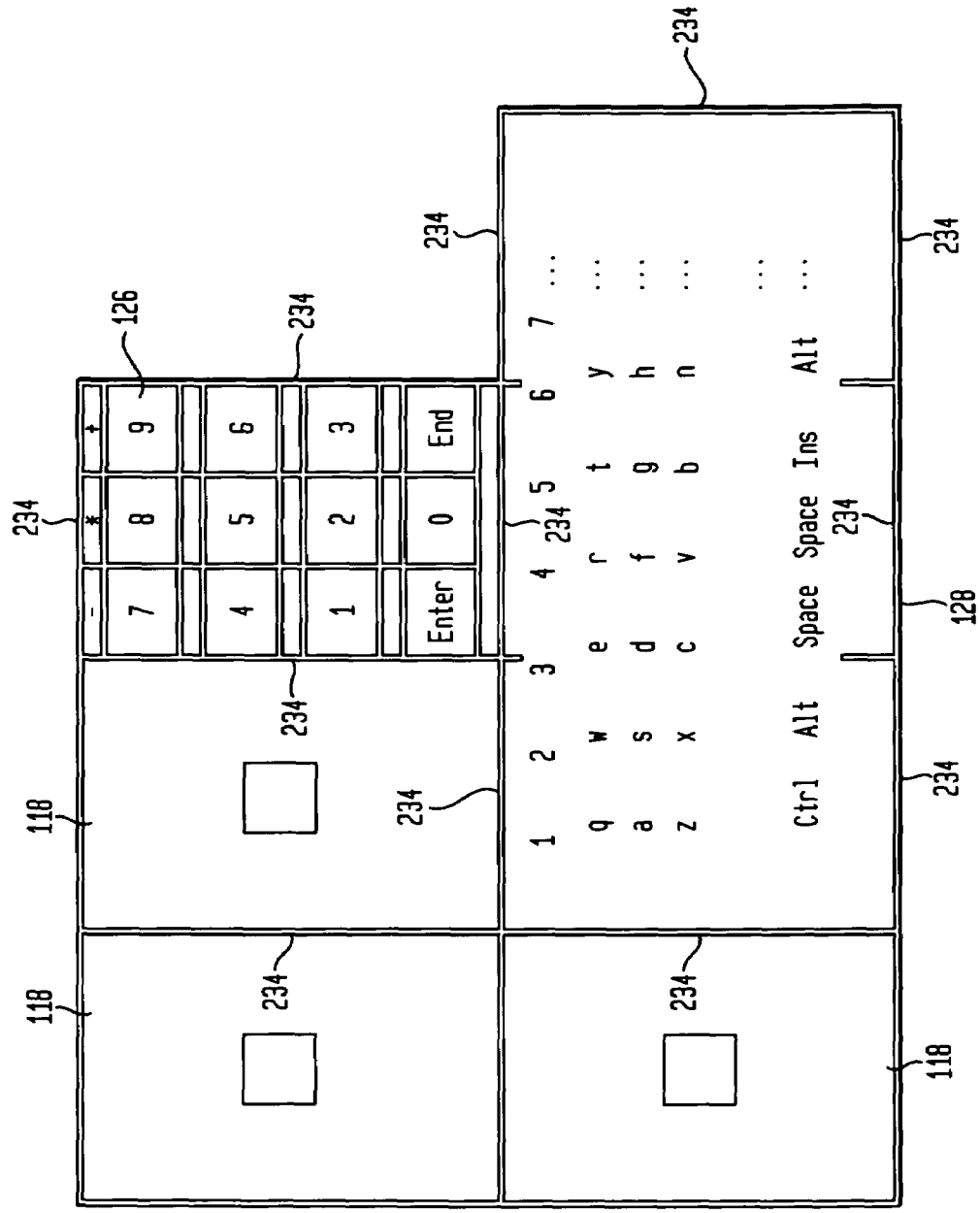
Figure 7D:
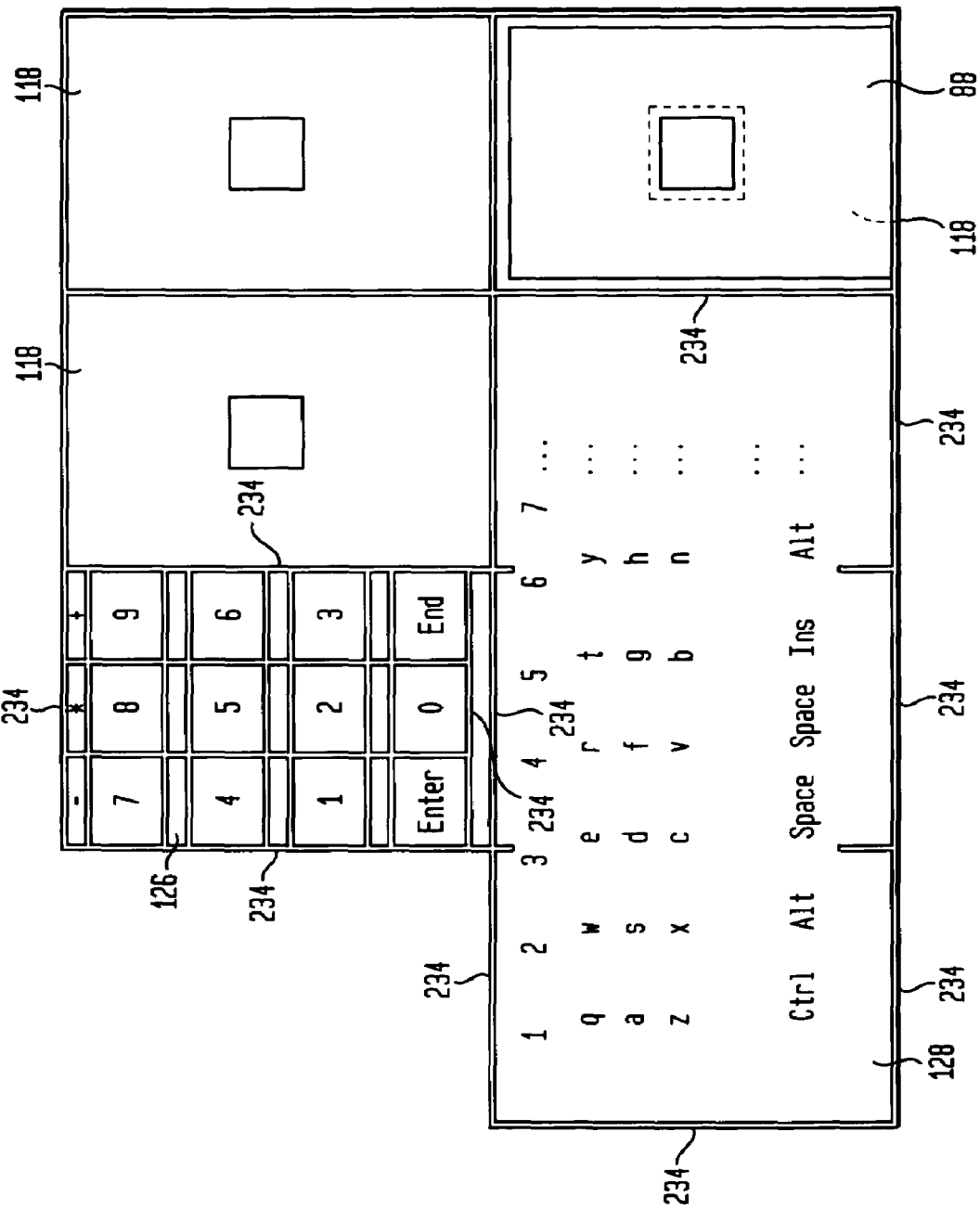

The multiple connector modules also provide for numerous module connection configurations. For example, and as shown in FIGS. 1 and 6, the computer cavity 16 is segregated into four sections, namely, 3 top sections and a large bottom section. The bottom section contains a modular alphanumeric keypad, while the top smaller sections 118 are provided for accommodating various modules 26, such as a numeric keypad, touch pad, mouse, speakers, track ball, music player, floppy disk drive, hard disk drive, or optical disk drive (e.g. CD or DVD) writer and/or reader), etc. Thus, and as shown in FIG. 6, the keyboard will be located along the bottom edge of the housing section 14 (as shown in FIG. 1) 50 that the keyboard is closer to a user when the computer is in use. However, and due to the versatility of the design of the present invention, the keyboard can be, alternatively, positioned along the upper section of the housing section 14 and offset so that a portion of the keyboard extends beyond the mounting region 16 and a numeric keypad 126 can be located in a bottom region (FIG. 7A), along the bottom mounting regions in an offset manner (FIG. 7B) or in numerous other configurations (FIGS. 7C, 7D and 7E). It should also be noted that the position of each, connector 20 in the center of each region is a design choice and the connectors 20 may be alternatively positioned in other locations. For example, a non-centrally-located connector can be used, thereby allowing a keyboard module to be positioned askew from the monitor 12.

As a design choice for a numeric keypad, it is contemplated that the keypad have a relatively low profile which can be accomplished, for example, with the keys mounted below a planar membrane, or with a touch pad-type interface. This will safeguard against inadvertent data entry on the keypad, such as when a user's hand accidentally strikes the keypad, etc.

As should be appreciated, the inventive modular computer allows a user to customize placement of various computer components according to a user's preference. For example, if a user requires or prefers a separate numeric keypad rather than utilizing the numeric keys typically contained along a top row of keys on an alphanumeric keypad, a user can attach a numeric keypad module to one of the connectors 20 in one of the sections 18 of the cavity 16 for use in data entry, or remove the device and activate the wireless interface. In addition, the user can decide where placement of the numeric keypad module should be. Thus, if the user is left-handed, the numeric keypad maybe positioned within a left-most section 18. Regardless of placement of the modules, they will communicate through the connector interface 20 or wireless interface with other computer components, such as the computer processor. In this manner, any module can be connected to the keyboard system through an available or unoccupied module section 18, or totally removed from the computer, thereby providing for total flexibility.

Instead of the modules being designed for direct coupling or connection to the connectors 20, adapter interface devices 88 may be employed for interfacing a module with the connector 20. In this manner, different module manufacturers can develop non-standardized connection schemes or designs which will be accommodated by a custom or universal type adapter or wireless connection to connect the module to the inventive keyboard system.

Figure 8:
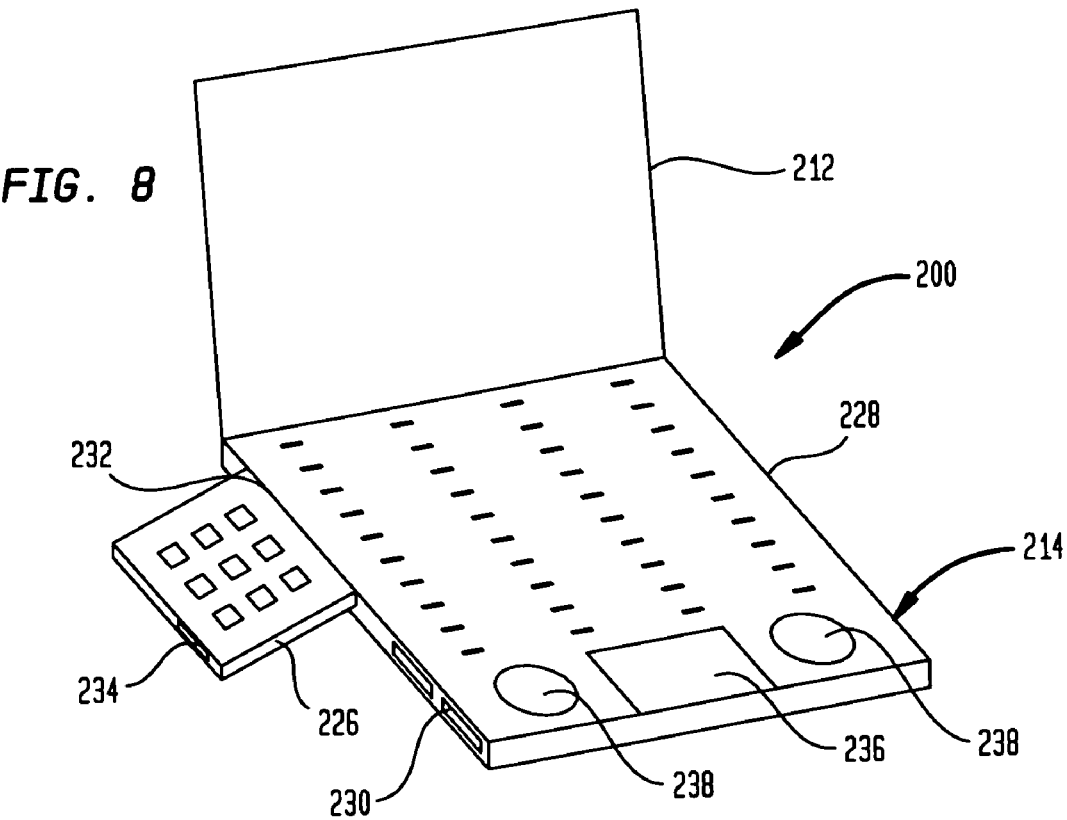
FIG. 8 is a perspective view of a computer in accordance with another embodiment of the present invention.

Turning now to FIG. 8, an alternative embodiment of a computer 200 in accordance with the present invention is depicted. Computer 200 contains a monitor 212 and a housing section 214 which, unlike computer 10 depicted in FIG. 1, supports a fixed keyboard 128 along with fixed components such as a touch pad 236 and speakers 238. However, along a portion of the peripheral edge of the computer housing section 214, a connector or bus interface 230 is disposed for providing access for auxiliary components to an interface bus (not shown). In this embodiment, each module 226 will have a corresponding interface or connector section 232 for mating or interfacing with the interface connector 230. Thus, for example, module 226 may be an external numeric keypad which is connected to the computer housing 114 as shown to provide for numeric data entry through the module. In this embodiment, like the embodiment depicted in FIG. 1, the interface connectors 230 are preferably segregated into multiple channels such that multiple modules 226 can be connected thereto and communicate with a computer processor through designated channels without interfering with communication occurring from adjacent modules.

In a further preferred embodiment, each module 226 may contain an additional pass through or auxiliary connection 234 such that two or more modules can be connected to each other while still providing communication with the computer processor. For example, if a touch pad, track hall or other module is used, it can be interfaced with the computer through the first module 226. Thus, the first module 226 will provide a pass through connection to allow the second module to interact with the computer processor, which is inherent to universal type connectors.

As will further be understood from the description shown above and as shown in the figures, in the preferred embodiment of the invention, modularity is available in two dimensions, i.e., both on a horizontal axis (from right to left), and on a vertical axis (from top to bottom). This is a significant advantage over modularity which is only one-dimensional, and improves the user's ability to ergonomically redesign the positioning of the input and output devices in the keyboard area. Alternatively, the keyboard area also allows one-dimensional modularity on a horizontal axis or on a vertical axis, if desired.

In other words, in one-dimensional modularity, a user can only place and rearrange two modules next to each other on a single axis, e.g. to the right and left of each other. In two dimensional modularity, the system has the capability of allowing the user to place modules on twos separate axis. Thus, in accordance with the invention, the user can rearrange the modules on both a vertical and a horizontal axis—modules can be positioned both to the left and right of each other, and also on top and on bottom of each other (i.e. above and below each other). Furthermore, any given module can take up the location of a single modular area or connector on the keyboard, or can take up multiple areas for insertion of modules, whether multiple areas next to each other and/or areas above and below each other. As a result, the user is provided with complete flexibility in deciding where each module will be located, and how they will be positioned with respect to each other.

Preferably, the connectors for the modules are arranged in a symmetrical fashion, so as to create a design having the greatest degree of flexibility of module placement. Likewise, each modular section can be the same size as or a different size than the other modular sections. In the preferred embodiment, the connectors are universal connectors as discussed above, so that any of the module can plug into any of the connectors (i.e. regardless of whether the module is a keyboard, or a trackball, or a music player or so forth), providing full interchangeability for the modules. Any of the modules can be placed in the area where the keyboard is normally fixedly placed by the manufacturer. One or more modules can also extend over or beyond a side of the unit, as discussed and shown, for example, with respect to module 226 in FIG. 8. Instead of being fixedly placed, the keyboard is removable by the user, as are the other input and output devices of the notebook computer, allowing the user to customize the ergonomics and features of the system to meet his or her preference.

In a further embodiment of the invention, a user-customizable keyboard system is provided in which a user can change the value of any physical key on the keyboard with such value preferably being displayed directly on the key. In on embodiment, the system is provided on a computer, whether a notebook or desktop computer, or so forth. In a further alternate or additional embodiment, the keys of the invention can be provided on the entire keyboard (e.g. a standard keyboard but with the display keys described below). In an preferred embodiment, the keys are provided on one or more modules of the modular keyboard described above.

In accordance with the invention, the system preferably includes a hardware component in the form of a keyboard which displays characters thereon (e.g. by an LCD or LED located on the key) and a software component for assigning desired characters to desired keys. Any value, character or function can be assigned to any key on the physical keyboard (whether a whole keyboard or a module), referred to herein as the "Hard" Keyboard. This choice and customization of keys by the user produces a "Soft" Keyboard, i.e. a keyboard layout in which the particular values desired by the user for some or all of the keys have been mapped to the physical keys of the keyboard. The Hard Keyboard can be a physical keyboard with any of the standard physical keyboard layouts (particularly, the layouts currently being used for computer keyboards). Alternatively, the physical keyboard itself can also be a customized layout, whether for general use or for particular applications (e.g. retail store cash registers, or so forth).

For example, in one embodiment of the invention, any of the standard characters in the Windows character sets can be mapped to any desired physical key for some or all of the physical keys. Alternatively or additionally, the user or a third party can create other values for keys, whether customized characters, symbols or groups of characters or so forth (such as icons or other graphics, words, phrases, etc.) and can map them to particular keys. Using a software application provided with the LCD Keyboard, the user determines which words, characters or other symbols, are associated with which keys. Pressing the relevant key on the physical keyboard will then generate that particular word, character, etc.

In a user defined character set, the user can assign a key a particular name such as "My name" and can assign a key value to that key (such as "Morris S. Cohen"). The key name appears on the physical key, via an LCD on the key which displays that key name on it. Thus, in this example, the physical key would display the words "my name" thereon. When that key is pressed, it sends or prints out the associated key value ("Morris S. Cohen"). In an alternate embodiment, the value is displayed directly on the key. However, for some values (e.g. a sentence or group of words), the value will may be too long for display, and therefore in such cases display of the key name is preferred. Other examples for key name can be "My Fax", "My Phone", "My E-mail", or any other desired value; when the key is "hit", it prints the assigned value. This not only provides accuracy in the "typing" but saves keystrokes as well.

The keyboard or module can display any "key name" and display any "key value". Preferably, the key names and key values should not be changed in the Windows' character sets to avoid confusion; values are only changed in user-defined character sets (which can include any standard or customized characters therein). Even with windows characters, however, the positioning of the "key name" (the location of that key on the keyboard) can be arranged and rearranged on the Hard Keyboard at will.

Furthermore, software manufacturers who normally and routinely assign "special functions" to different "F" keys or a combination of keystrokes can now create a character set and assign desired "key values" to particular "key names". For example, in a program such as Microsoft Word, a particular key can be assigned the value of Print or "Print". (Software can displays the customized layout on the computer screen, and the physical keyboard can display the key name or key value). Likewise, any Macro can be assigned to any desired key.

Thus, the keyboard system provides the ability to modify a key value on the keyboard and allows the user to choose for themselves, the value of the key, the position of the key as well, and the physical appearance of the key (the readout of the LCD on the key itself). The key is made of an LCD matrix of any dimension and a length of matrices can be theoretically be as long as the manufacturer of the keyboard so desires. A single key can have as many LCD displays on it as desired by the manufacturer.

The "Soft" Keyboard is identical in its dimensions and layout to the "Hard" Keyboard. Key values on the "Soft" Keyboard are chosen from the available character sets in Windows or from any third party software character set or from a user defined character sets of names and values as chosen by the user themselves. Once the "Soft Keyboard" layout is chosen and configured, a simple connection is made with the "Hard" Keyboard and the hard keyboard is arranged as chosen by the user with the soft Keyboard.

Theoretically, because any key can contain any value, character, or function, this system can be used for machines such as cash registers, where names and values can be assigned at will, in different languages, and different layouts. Machines with different levels of operation (computer keyboards, copy and fax machines, etc.) often requiring memorization of names and values can instead display those names and values directly, and/or with shift buttons, control buttons, alt buttons, and so forth.

In accordance with the invention, manufacturers of calculators can therefore create software to run on the keyboard system to assign values, characters and functions to a computer key pad, allowing the user to use the keyboard as a business, statistical, scientific etc. calculator as well. Similarly, computer programmers are provided with the ability to define keys with values such as programming language commands that can be displayed in a programmer's work by hitting on a physical key instead of typing the keystrokes necessary to produce the command.

For example assigning the "key name" to be "RES" and the key value to be "RESTORE" can result in pushing the key "RES" to display the value "RESTORE" instead of typing 7 characters, all the programmer has to do is push a single button after the programmer assigns the value to the key. This can be done with any and all computer programming languages.

As mentioned above frequently used and typed commands can be assigned a key name and pushed to produce that value.

Having described this invention with regard to specific embodiments, it is to be understood that the description is not meant as a limitation since further embodiments, modifications and variations may be apparent or may suggest themselves to those skilled in the art. It is intended that the present application cover all such embodiments, modifications and variations.

What is claimed is:

1. An apparatus comprising:
 a notebook computer, said computer comprising a top surface of a notebook body, said top surface comprising a module which connects to said computer when on said top surface, said module being removable from said top surface by a user;
 wherein said module is positioned two-dimensionally on said top surface in the location selected by the user;
 such that said module is positioned on said notebook body in any of a plurality of horizontal positions, said horizontal positions being positions along an axis of said top surface extending from right to left;
 and such that said module is positioned on said notebook body in any of a plurality of vertical positions, said vertical positions being positions along an axis of said top surface in a direction from the screen of said computer toward the traditional location of the keyboard spacebar;
 such that the position of said module is adjustable by the user from right to left and closer to the screen or closer to the user's body.

2. An apparatus comprising:
 a notebook computer, said computer comprising a housing, said housing comprising a top surface of a notebook body, said top surface comprising a plurality of connector interfaces;
 said computer further comprising a module on said top surface such that said module attaches to and detaches from said connector interfaces;
 wherein said module is positioned two-dimensionally on said top surface in a location selected by a user;
 such that said module is positioned on said notebook body in any of a plurality of horizontal positions, said horizontal positions being positions along an axis of said top surface extending from right to left;

and such that said module is positioned on said notebook body in any of a plurality of vertical positions, said vertical positions being positions along an axis of said top surface in a direction from the screen of said computer toward the traditional location of the keyboard spacebar;

such that the position of said module is adjustable by the user from right to left and closer to the screen or closer to the user's body.

3. An apparatus as claimed in claim 2, wherein at least one of said connector interfaces is a universal serial bus connector.

4. An apparatus as claimed in claim 2, wherein said computer comprises a processor and at least one of said connector interfaces communicates with said processor.

5. An apparatus as claimed in claim 2, wherein said computer comprises a bus, and at least one of said connector interfaces communicates with said bus.

6. An apparatus as claimed in claim 5, wherein said bus is a multichannel bus.

7. An apparatus as claimed in claim 2, wherein said apparatus comprises a plurality of said module and said top surface comprises a plurality of sections, and wherein each of said sections comprises at least one of said connector interfaces.

8. An apparatus as claimed in claim 2, wherein said module attaches to a plurality of said connector interfaces.

9. An apparatus as claimed in claim 2, wherein said module attaches to a single one of said connector interfaces.

10. An apparatus as claimed in claim 2, wherein said module comprises a keyboard.

11. An apparatus as claimed in claim 2, wherein said module comprises a numeric keypad.

12. An apparatus as claimed in claim 2, wherein said module comprises a touch pad.

13. An apparatus as claimed in claim 2, wherein said module comprises a trackball.

14. An apparatus as claimed in claim 2, wherein said module comprises a music player.

15. An apparatus as claimed in claim 2, wherein said module comprises a speaker.

16. An apparatus as claimed in claim 2, wherein said module comprises a disk drive.

17. An apparatus as claimed in claim 2, wherein said housing comprises a peripheral edge, and wherein said peripheral edge comprises at least one connector.

18. An apparatus as claimed in claim 17, wherein said module can be attached to said connector on said peripheral edge.

19. An apparatus as claimed in claim 2, wherein said module comprises a pass through interface for attachment of a second module to said module comprising said pass through interface.

20. An apparatus as claimed in claim 2, further comprising an adapter for connecting said module to at least one of said connector interfaces.

21. An apparatus as claimed in claim 2, wherein said module comprises keys comprising a display.

22. An apparatus as claimed in claim 21, wherein said display is an LCD or LED display, and wherein said display is customizable by the user.

23. An apparatus as claimed in claim 1, wherein said module utilizes a wireless transmitter system.

24. An apparatus as claimed in claim 1, wherein said computer comprises a computer processor, and said module utilizes a wireless transmitter system to interface with said computer processor.

25. An apparatus comprising:

a notebook computer, said computer comprising a top surface of a notebook body, said top surface comprising at least one module and comprising a plurality of connector interfaces;

such that said module is positioned by a user on said notebook body in any of a plurality of vertical positions, said vertical positions being positions along an axis of said top surface in a direction from the screen of said computer toward the traditional location of the keyboard spacebar;

such that the position of said module is adjustable by the user closer to the screen or closer to the user's body.

26. An apparatus as claimed in claim 1, wherein said module comprises a keyboard.

27. An apparatus as claimed in claim 25, wherein said module comprises a keyboard.

* * * * *